US012555762B2

(12) United States Patent
Mukousaka et al.

(10) Patent No.: US 12,555,762 B2
(45) Date of Patent: Feb. 17, 2026

(54) MASS SPECTROMETRY APPARATUS AND MASS SPECTROMETRY METHOD FOR ADJUSTING ION ACCUMULATION TIMES BASED ON DETECTION INTENSITY

(71) Applicant: JEOL Ltd., Tokyo (JP)

(72) Inventors: Shinichi Mukousaka, Tokyo (JP); Junkei Kou, Tokyo (JP); Kiyotaka Konuma, Tokyo (JP)

(73) Assignee: JEOL Ltd., Tokyo (JP)

( * ) Notice: Subject to any disclaimer, the term of this patent is extended or adjusted under 35 U.S.C. 154(b) by 477 days.

(21) Appl. No.: 17/974,836

(22) Filed: Oct. 27, 2022

(65) Prior Publication Data

US 2023/0140037 A1 May 4, 2023

(30) Foreign Application Priority Data

Oct. 28, 2021 (JP) ................................ 2021-176494

(51) Int. Cl.
*H01J 49/42* (2006.01)
*H01J 49/00* (2006.01)
*H01J 49/10* (2006.01)

(52) U.S. Cl.
CPC .......... *H01J 49/10* (2013.01); *H01J 49/0031* (2013.01); *H01J 49/4215* (2013.01)

(58) Field of Classification Search
None
See application file for complete search history.

(56) References Cited

U.S. PATENT DOCUMENTS

| | | | | |
|---|---|---|---|---|
| 2002/0048818 | A1 | 4/2002 | Sakairi et al. | |
| 2002/0110490 | A1 | 8/2002 | Sakairi et al. | |
| 2004/0113063 | A1 * | 6/2004 | Davis ...................... | H01J 49/38 250/282 |
| 2004/0169139 | A1 | 9/2004 | Sakairi et al. | |
| 2019/0287784 | A1 | 9/2019 | Kou | |
| 2020/0051804 | A1 * | 2/2020 | Izumi .................. | H01J 49/4265 |

FOREIGN PATENT DOCUMENTS

| | | | |
|---|---|---|---|
| EP | 3608942 | A1 | 2/2020 |
| JP | 2000162189 | A | 6/2000 |
| JP | 2000173532 | A * | 6/2000 |
| JP | 2000340170 | A | 12/2000 |
| JP | 201720877 | A | 1/2017 |
| JP | 2019164919 | A | 9/2019 |
| JP | 2020024890 | A | 2/2020 |

OTHER PUBLICATIONS

Office Action issued in JP2021176494 on Oct. 17, 2023.
Extended European Search Report issued in EP22200947.4 on Mar. 27, 2023.

* cited by examiner

*Primary Examiner* — James Choi
(74) *Attorney, Agent, or Firm* — The Webb Law Firm

(57) ABSTRACT

Ions ejected from a collision cell are detected by a detector. An evaluation unit generates a temporary calibration curve based on an intensity of a detection signal and evaluates an ion accumulation time of the collision cell based on the temporary calibration curve. When the evaluation unit determines signal saturation, the ion accumulation time of the collision cell is reduced. When the evaluation unit determines sensitivity insufficiency, the ion accumulation time of the collision cell is increased.

9 Claims, 8 Drawing Sheets

FIG. 5

62

| Compound name | Transition | CE | Accumulation time | Alert |
|---|---|---|---|---|
| A | 302 -> 232 | 25 | Standard | --- |
| B | 290 -> 220 | 25 | Standard | Sensitivity insufficiency |
| C | 304 -> 241 | 34 | Standard | Signal saturation |
| D | 316 -> 252 | 34 | Standard | Sensitivity insufficiency |
| . . . | . . . | . . . | . . . | . . . |

64

| Compound name | Transition | CE | Accumulation time | Alert |
|---|---|---|---|---|
| A | 302 -> 232 | 25 | Standard | — |
| B | 290 -> 220 | 25 | Longer time | — |
| C | 304 -> 241 | 34 | Shorter time | — |
| D | 316 -> 252 | 34 | Longer time | — |
| . . . | . . . | . . . | . . . | . . . |

MASS SPECTROMETRY APPARATUS AND MASS SPECTROMETRY METHOD FOR ADJUSTING ION ACCUMULATION TIMES BASED ON DETECTION INTENSITY

CROSS REFERENCE TO RELATED APPLICATION

This application claims priority to Japanese Patent Application No. 2021-176494 filed Oct. 28, 2021, the disclosure of which is hereby incorporated by reference in its entirety.

BACKGROUND

Field of the Invention

The present disclosure relates to a mass spectrometry apparatus and a mass spectrometry method and, in particular, relates to controlling the operation of a collision cell with ion accumulation.

Description of Related Art

A mass spectrometry apparatus includes, for example, an ion source, a first mass spectrometry unit, a collision cell, a second mass spectrometry unit, and a detector. Such a mass spectrometry apparatus has a plurality of operation modes, which include an SRM (Selected Reaction Monitoring) mode.

When the SRM mode is selected, the first mass spectrometry unit passes only ions (precursor ions) having a first selected mass (to be more precise, a first selected mass-to-charge ratio). In the collision cell, ions ejected from the first mass spectrometry unit collide with gas, thereby producing various product ions (fragment ions). The second mass spectrometry unit passes only product ions having a second selected mass (to be more precise, a second selected mass-to-charge ratio). Product ions ejected from the second mass spectrometry unit are detected by the detector. The SRM mode is also known as an MRM (Multiple Reaction Monitoring) mode.

The first mass spectrometry unit, the collision cell, and the second mass spectrometry unit may be each composed of a quadrupole, and a mass spectrometry apparatus including those quadrupoles is referred to as triple quadrupole mass spectrometer. A combination of the first selected mass and the second selected mass is referred to as transition.

JP 2017-20877 A discloses a mass spectrometry apparatus that includes a collision cell. The collision cell is a collision cell without ion accumulation. To prevent signal saturation, the transition is switched.

JP 2019-164919 A discloses a mass spectrometry apparatus that includes a collision cell with ion accumulation. JP 2019-164919 A does describe changing the ion accumulation time of the collision cell with ion accumulation, but nowhere describes changing the ion accumulation time based on a detection signal.

SUMMARY

In a mass spectrometry apparatus that includes a collision cell with ion accumulation, signal saturation occurs when the collision cell has too large an ion accumulation time, and sensitivity insufficiency occurs when the collision cell has too small an ion accumulation time.

The present disclosure is directed toward preventing signal saturation and sensitivity insufficiency in a mass spectrometry apparatus that includes a collision cell with ion accumulation. Alternatively, the present disclosure is directed toward setting an appropriate ion accumulation time for each transition in a mass spectrometry apparatus that includes a collision cell with ion accumulation.

According to one aspect of the present disclosure, there is provided a mass spectrometry apparatus comprising a collision cell that performs accumulation and ejection alternately; a detector that detects ions ejected from the collision cell; and an evaluation unit that evaluates an ion accumulation time of the collision cell based on an intensity of a detection signal output from the detector.

According to another aspect of the present disclosure, there is provided a mass spectrometry method comprising detecting ions ejected from a collision cell that performs accumulation and ejection alternately; evaluating an ion accumulation time of the collision cell based on an intensity of a detection signal obtained through detection of the ions; and correcting the ion accumulation time based on a result of evaluation of the ion accumulation time.

BRIEF DESCRIPTION OF THE DRAWINGS

Embodiments of the present disclosure will be described based on the following figures, wherein:

FIG. 5 is a diagram for describing the presentation of a list and the change of an accumulation time;

DESCRIPTION

(1) Overview of Embodiments

Figure 1:
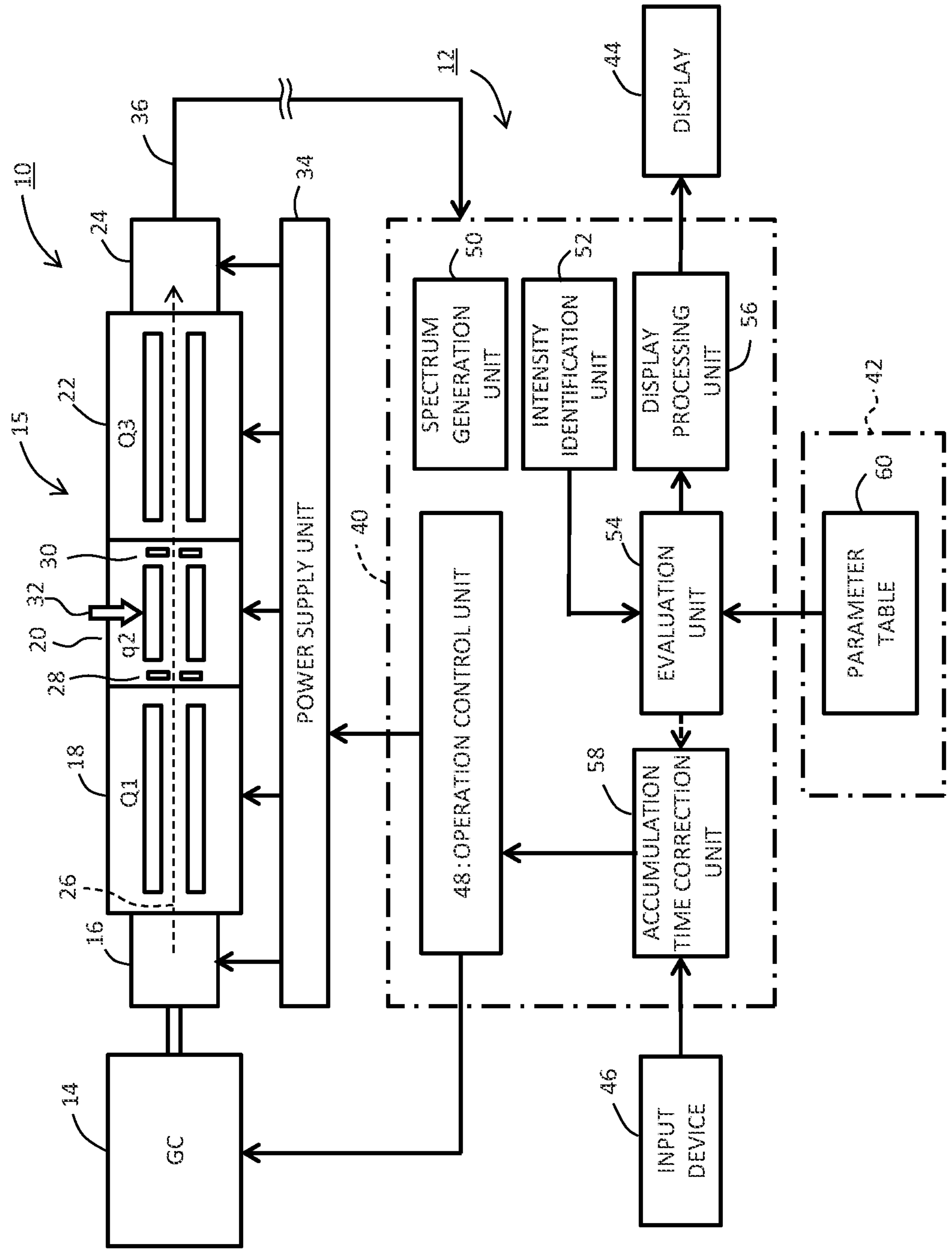
FIG. 1 is a block diagram showing a mass spectrometry apparatus according to an embodiment of the present disclosure.

A mass spectrometry apparatus according to an embodiment of the present disclosure includes a collision cell, a detector, and an evaluation unit. The collision cell alternately performs accumulation and ejection. Ions ejected from the collision cell are detected by the detector. The evaluation unit evaluates an ion accumulation time of the collision cell based on the intensity of a detection signal that is output from the detector. A processor, which will be described later, serves as the evaluation unit.

With the above-described configuration, the ion accumulation time may be corrected based on a result of evaluation of the ion accumulation time. In that case, the ion accumulation time may be changed automatically, or the ion accumulation time may be changed manually. The ion accumulation time may be corrected automatically based on change instructions from a user.

In an embodiment, the evaluation unit includes a first determination unit and a second determination unit. The first determination unit determines signal saturation based on the intensity of a detection signal. The second determination unit determines sensitivity insufficiency based on the intensity of a detection signal. A correction unit is composed of a first correction unit and a second correction unit. When signal saturation is determined, the first correction unit reduces the ion accumulation time either according to that determination result or according to a user instruction. When sensitivity insufficiency is determined, the second determination unit increases the ion accumulation time either according to that determination result or according to a user instruction. The ion accumulation time may be changed continuously or may be changed stepwise. A processor, which will be described later, serves as the first determination unit, the second determination unit, the first correction unit, and the second correction unit.

The mass spectrometry apparatus according to an embodiment of the present disclosure includes an ion source that ionizes a sample, the ion source being provided upstream of the collision cell. The evaluation unit evaluates the ion accumulation time over a target concentration range based on the intensity of a detection signal and the concentration of the sample. The target concentration range is a range in which a calibration curve is generated, or a range of concentration for which analysis is performed. The target concentration range may be set as a concentration range that is defined by a lower concentration limit and an upper concentration limit.

In an embodiment, the evaluation unit generates a temporary calibration curve based on the intensity of a detection signal and the concentration of the sample, and determines that the ion accumulation time is appropriate when the temporary calibration curve falls within an appropriate zone over the target concentration range. The temporary calibration curve is drawn on a coordinate system that is defined by a concentration axis and an intensity axis. The temporary calibration curve may be defined on that coordinate system as a straight line or a curved line that passes through coordinates (an actual measurement point) identified by the intensity of a detection signal and the concentration of the sample, and a point of origin or its corresponding point. The temporary calibration curve may be defined as a straight line or a curved line obtained from a plurality of actual measurement points. The use of the temporary calibration curve makes it easy to determine whether or not the ion accumulation time is appropriate over the entire target concentration range.

In an embodiment, the evaluation unit determines signal saturation when the temporary calibration curve is above the appropriate zone in the target concentration range. The evaluation unit determines sensitivity insufficiency when the temporary calibration curve is below the appropriate zone in the target concentration range. The appropriate zone is, in an embodiment, a portion in a two-dimensional area that is defined by an upper concentration limit, a lower concentration limit, an upper intensity limit, and a lower intensity limit.

In an embodiment, a plurality of intensities corresponding to a plurality of concentrations are obtained through repeated measurements of a sample while the concentration of the sample is being changed. The evaluation unit generates a temporary calibration curve based on the plurality of concentrations and the plurality of intensities. This configuration increases the reliability of the temporary calibration curve.

In an embodiment, a plurality of compounds extracted from a standard sample are sequentially introduced into the ion source. Each of the compounds corresponds to a sample. The evaluation unit evaluates the ion accumulation time for each compound. The mass spectrometry apparatus according to an embodiment of the present disclosure includes a list generation unit that generates a list showing a result of evaluation of the ion accumulation time for each compound, and a display that presents the list. The mass spectrometry apparatus further includes an input device for providing an instruction to change the ion accumulation time for each compound. A plurality of ion accumulation times corresponding to a plurality of compounds may be corrected collectively or may be corrected individually. A processor, which will be described later, serves as the list generation unit.

In an embodiment, after the ion accumulation time for each compound is set or corrected using a standard sample, an analyte sample is analyzed. After the ion accumulation time for each compound is set or corrected, a calibration curve for each compound may be generated, and an analyte sample may then be analyzed quantitatively.

A mass spectrometry method according to an embodiment of the present disclosure includes a detection step, an evaluation step, and a correction step. In the detection step, ions ejected from a collision cell that alternately performs accumulation and ejection are detected. In the evaluation step, the ion accumulation time of the collision cell is evaluated based on the intensity of a detection signal obtained through detection of the ions. In the correction step, the ion accumulation time is corrected based on a result of evaluation of the ion accumulation time.

(2) Details of Embodiments

FIG. 1 shows a mass spectrometry apparatus according to an embodiment of the present disclosure. The mass spectrometry apparatus is used in qualitative analysis and quantitative analysis of a sample. The mass spectrometry apparatus is composed of a measurement unit 10 and an information processing unit 12. The measurement unit 10 is composed of a gas chromatograph (GC) 14 and a mass spectrometer 15.

The gas chromatograph 14 includes a column that separates and extracts a plurality of components that constitute a sample; that is, a plurality of compounds. The separated compounds are sequentially fed from the gas chromatograph 14 to the mass spectrometer 15. Each of the compounds that are introduced into the mass spectrometer 15 serves as a sample for the mass spectrometer 15.

The mass spectrometer 15 includes an ion source 16, a first mass spectrometry unit (Q1) 18, a collision cell (q2) 20, a second mass spectrometry unit (Q3) 22, and a detector 24. Each of the first mass spectrometry unit 18, the collision cell 20, and the second mass spectrometry unit 22 includes a quadrupole. The mass spectrometer 15 is a triple quadrupole mass spectrometer. A different mass spectrometer may be used as the mass spectrometer 15.

The mass spectrometer 15 has a plurality of operation modes, which include a scan mode, a product ion scan mode, an SRM mode, and others. In the scan mode, among the first mass spectrometry unit 18, the collision cell 20, and the second mass spectrometry unit 22, only the first mass spectrometry unit 18 functions. In the product ion scan mode and the SRM mode, all of the first mass spectrometry unit 18, the collision cell 20, and the second mass spectrometry unit 22 function. The following description basically describes each of the constituting elements on the assumption that the SRM mode is used.

The ion source 16 ionizes an introduced compound; that is, a sample, thereby producing ions. Various types of ion sources may be used as the ion source 16. FIG. 1 shows a trajectory 26 of ions that reach the detector 24.

The first mass spectrometry unit 18 is a first mass filter, and only ions having a selected mass (first selected mass) pass through the first mass spectrometry unit 18. The first selected mass is, to be more precise, a selected mass-to-charge ratio (first selected m/z).

The collision cell 20 is, in an embodiment, a collision cell with ion accumulation (ion accumulation and ejection). A gas 32, such as a collision-induced dissociation (CID) gas, is introduced into the collision cell 20. In the collision cell 20, ions ejected from the first mass spectrometry unit 18 collide with the gas. This causes fragmentation of the ions, thereby producing product ions (fragment ions) that have different masses. The collision cell 20 includes an entrance electrode 28 and an exit electrode 30. Their potentials are controlled, thereby causing ions to be accumulated in the collision cell 20, and causing the ions accumulated therein to be ejected from the collision cell 20 as ion pulses. In other words, the ion accumulation time may be changed through the control of the potential of the entrance electrode 28 and the potential of the exit electrode 30. The collision cell 20 repeats accumulation and ejection. Accumulation of ions is also referred to as trapping of ions. The ion accumulation time in the collision cell 20 may be set for each compound separated from a sample.

The second mass spectrometry unit 22 is a second mass filter, and only ions having a selected mass (second selected mass) pass through the second mass spectrometry unit 22. The second selected mass is, to be more precise, a selected mass-to-charge ratio (second selected m/z). As already described, a combination of the first selected mass and the second selected mass is referred to as transition. One or a plurality of transitions are designated for each compound.

The detector 24 detects ions that are ejected from the second mass spectrometry unit 22, thereby outputting a detection signal. In the scan mode or the product ion scan mode, a series of detection signals are obtained according to dynamic change of the selected mass. A mass spectrum is generated based on the series of detection signals. In the SRM mode, a detection signal is obtained for each transition. As will be described later, the ion accumulation time is evaluated based on the intensity of the detection signal. A detection signal that is output from the detector 24 is fed to the information processing unit 12 via a signal processing circuit, which is not illustrated. The signal processing circuit includes an A/D converter and other components.

The measurement unit 10 includes a power supply unit 34. The power supply unit 34 supplies a voltage signal to each of the constituting elements that constitute the mass spectrometer 15. The collision cell 20 performs accumulation and ejection through the control of a voltage signal supplied to the entrance electrode 28 in the collision cell 20 and the control of a voltage signal supplied to the exit electrode 30 in the collision cell 20. Collision energy (CE) is controlled through the control of a voltage signal supplied to the collision cell 20.

The information processing unit 12 is composed of, for example, a computer. The information processing unit 12 includes a processor 40, a storage unit 42, a display 44, and an input device 46. The processor 40 is composed of, for example, a CPU that executes a program. The storage unit 42 is composed of a semiconductor memory, a hard disk, and others. The display 44 is composed of, for example, a liquid crystal display. The input device 46 is composed of a keyboard, a pointing device, and others.

In FIG. 1, a plurality of functions that are performed by the processor 40 are represented in the form of a plurality of blocks. The processor 40 serves as an operation control unit 48, a spectrum generation unit 50, an intensity identification unit 52, an evaluation unit 54, a display processing unit 56, an accumulation time correction unit 58, and others. The storage unit 42 stores a parameter table 60. The parameter table is composed of a plurality of parameter sets corresponding to a plurality of compounds. Each of the parameter sets is composed of a plurality of numeric values that identify a lower concentration limit, an upper concentration limit, a lower intensity limit, an upper intensity limit, and others. A common single parameter set may be used for a plurality of compounds.

In the scan mode, the first mass spectrometry unit 18 functions, and the collision cell 20 and the second mass spectrometry unit 22 substantially do not function. In that mode, the first mass spectrometry unit 18 repeatedly scans the first selected mass. Based on detection signals thereby obtained, the spectrum generation unit 50 repeatedly generates a mass spectrum. Based on a mass spectrum array thereby obtained, a TICC generation unit, which is not illustrated, generates a TICC (total ion current chromatograph).

In the product ion scan mode, the first mass spectrometry unit 18, the collision cell 20, and the second mass spectrometry unit 22 function. While the first selected mass is being fixed, the second selected mass is scanned repeatedly. Based on detection signals thereby obtained, the spectrum generation unit 50 repeatedly generates a mass spectrum. Each of the mass spectra is a product ion mass spectrum.

In the SRM mode, the first mass spectrometry unit 18, the collision cell 20, and the second mass spectrometry unit 22 function. A detection signal is obtained for each transition, and the intensity identification unit 52 identifies the intensity of the detection signal. The intensity of the detection signal is, for example, a height or an area of a peak that appears on a time axis. In an embodiment, a standard sample is measured prior to measurement of a sample that is under quantitative analysis. During the process of, or subsequent to, performing the SRM mode using a standard sample, the ion accumulation time is evaluated and corrected. However, the ion accumulation time may be evaluated and corrected on the assumption that another mode is performed.

The evaluation unit 54 evaluates, for each transition (that is, for each compound), whether or not the ion accumulation time is appropriate, based on the intensity of a detection signal. Specifically, for each transition, a temporary calibration curve is generated based on the intensity of a detection signal, and signal saturation and sensitivity insufficiency are determined based on the temporary calibration curve. More specifically, the evaluation unit 54 determines whether or not signal saturation is present in a range of concentration for which quantification is performed (target concentration range), and determines whether or not sensitivity insufficiency is present in the target concentration range. When viewed from this perspective, the evaluation unit 54 corresponds to a first determination unit that determines signal saturation and a second determination unit that determines sensitivity insufficiency. A method of evaluating the ion accumulation time based on the temporary calibration curve will be described later in detail by reference to FIG. 6 and others.

The display processing unit 56 serves as a list generation unit and, more specifically, generates a list showing an evaluation result for each compound. The display 44 presents the list. Based on the presented list, a user can recognize whether or not the ion accumulation time is appropriate for each compound. An instruction to change the ion accumulation time for each compound is input from the user via the input device 46.

Based on the instruction from the user, the accumulation time correction unit 58 corrects the ion accumulation time. The accumulation time correction unit 58 corresponds to a first correction unit and a second correction unit. The first correction unit reduces the ion accumulation time when signal saturation is determined, and the second correction unit increases the ion accumulation time when sensitivity insufficiency is determined. For example, a plurality of ion accumulation times corresponding to a plurality of compounds may be corrected collectively, or an ion accumulation time corresponding to each compound may be corrected individually. The accumulation time correction unit 58 may automatically correct the ion accumulation time based on an evaluation result or a determination result from the evaluation unit 54.

The operation control unit 48 controls the operation of the GC 14 and the mass spectrometer 15. The operation control unit 48 controls, through the control of the power supply unit 34, the operation of each of the constituting elements that constitute the mass spectrometer 15. According to the ion accumulation time that is set or corrected for each transition, the operation control unit 48 controls the potentials of the entrance electrode 28 and the exit electrode 30.

Figure 2:
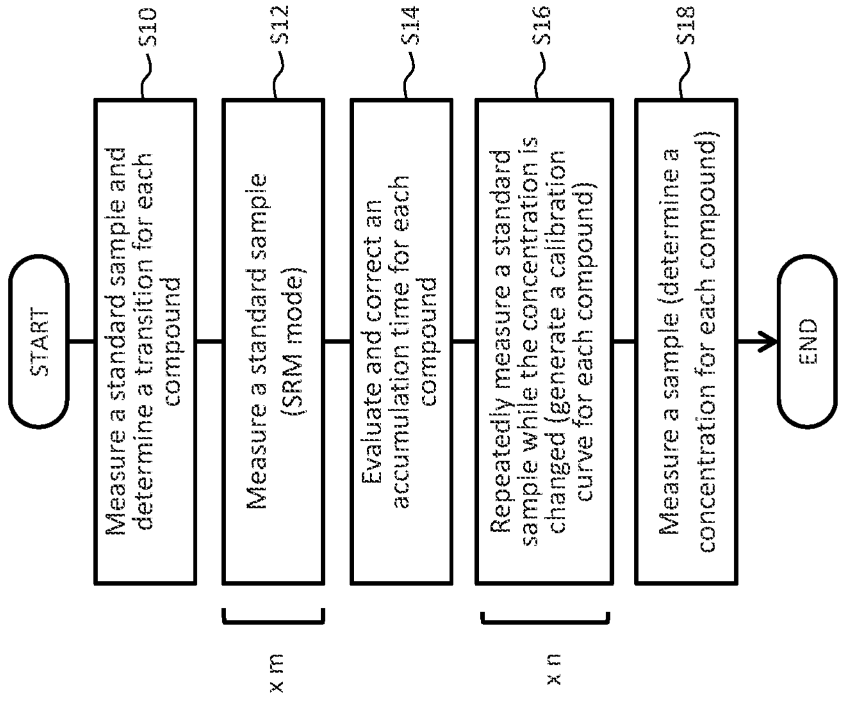
FIG. 2 is a flowchart showing a mass spectrometry method according to an embodiment of the present disclosure.

FIG. 2 shows a mass spectrometry method according to an embodiment of the present disclosure in the form of a flowchart. The items in FIG. 2 also represent the operation of the mass spectrometry apparatus shown in FIG. 1.

In FIG. 2, at S10, measurement of a standard sample having a freely chosen concentration is performed, and based on the results of the measurement, a transition (first selected mass and second selected mass) is determined for each compound. In S10, the scan mode and the product ion scan mode are used stepwise. The specific items of S10 will be described later by reference to FIG. 3. As a result of performing S10, a transition array consisting of a plurality of transitions corresponding to a plurality of compounds is obtained. A plurality of transitions may be determined for one compound.

In S12, a standard sample having a particular concentration; that is, a known concentration, is measured. During that process, the SRM mode is performed according to the transition array. While the concentration of the standard sample is being varied, S12 may be performed repeatedly. In FIG. 2, m represents the number of times S12 is performed, and m is an integer of 1 or greater. To shorten the measurement time, m may be 1 (m=1). In S10 and S12, a standard time is set as the ion accumulation time for each compound.

In S14, whether or not the ion accumulation time is appropriate is evaluated for each compound. Specifically, for each compound, a temporary calibration curve is generated based on the intensity of a detection signal (the number m of intensities), and based on the temporary calibration curve, whether or not the ion accumulation time is appropriate is determined. During that process, the concentration of the standard sample is taken into consideration. When signal saturation is predicted based on the temporary calibration curve, the ion accumulation time is corrected so that the ion accumulation time is reduced. When sensitivity insufficiency is predicted based on the temporary calibration curve, the ion accumulation time is corrected so that the ion accumulation time is increased. Although in an embodiment the ion accumulation time is corrected according to a user instruction, the ion accumulation time may be corrected automatically. As a result of performing S14, an ion accumulation time array with necessary correction is obtained.

In S16, a plurality of calibration curves corresponding to a plurality of compounds are generated using the ion accumulation time array that is obtained in the manner described above. Specifically, a standard sample is measured repeatedly while the concentration is changed. During that process, an ion accumulation time corresponding to each compound is set according to the ion accumulation time array. In FIG. 2, n represents the number of times measurement is performed; that is, the concentration count. Typically, n is an integer of 2 or greater. As described above, a plurality of detection signal intensities corresponding to a plurality of concentrations are obtained for each compound through repeated measurements of a standard sample while the concentration is changed. Based on the information described above, a calibration curve for each compound is generated for its quantitative analysis. That is, a calibration curve set consisting of a plurality of calibration curves corresponding to a plurality of compounds is generated.

In S18, a sample that is under quantitative analysis is measured. During that measurement, the SRM mode is selected. The SRM mode is performed according to the transition array, and according to the ion accumulation time array with necessary correction. According to an embodiment of the present disclosure, as the mass spectrometry method allows the ion accumulation time to be appropriate for each compound, no signal saturation or sensitivity insufficiency occurs, and the quantitative accuracy for each compound is increased.

Figure 3:
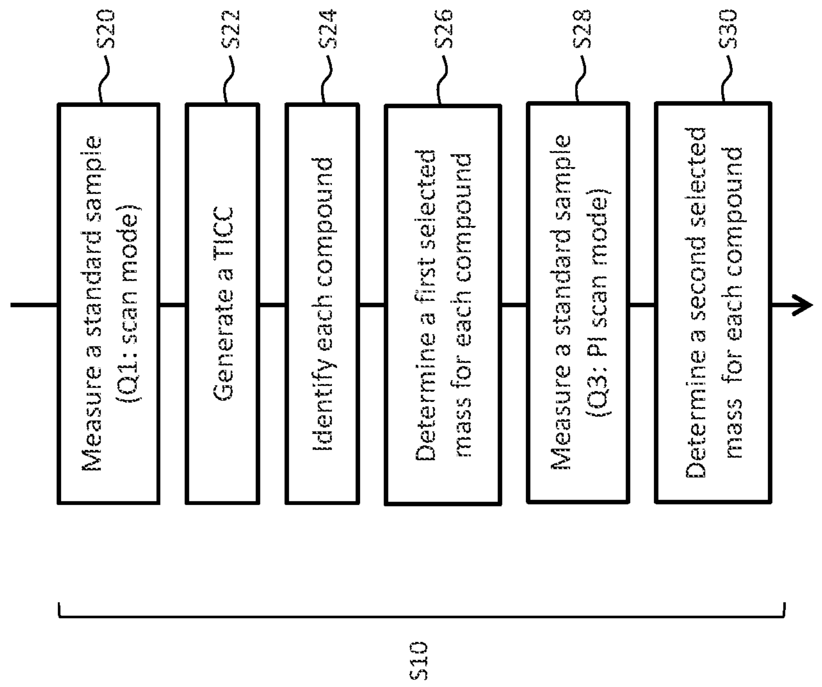
FIG. 3 is a flowchart showing a specific example of S10 shown in FIG. 2.

FIG. 3 shows a specific example of S10 in FIG. 2. In S20, the scan mode is selected. Each compound separated and extracted from a standard sample is measured while the first selected mass is scanned repeatedly in the first mass spectrometry unit (Q1). As a result, a mass spectrum array consisting of a plurality of mass spectra is obtained. In S22, a TICC (total ion current chromatograph) is generated based on the mass spectrum array. The TICC has a horizontal axis that serves as a retention time axis, and a vertical axis that represents a TIC (total ion current). The TIC corresponds to an integrated value of an overall mass spectrum.

In S24, a plurality of peaks corresponding to a plurality of compounds are identified in the TICC. A plurality of integrated mass spectra are generated based on the plurality of peaks. Library search is performed based on each of the integrated mass spectra to identify a compound. A representative peak is identified in a mass spectrum corresponding to the identified compound, and a mass corresponding to the representative peak is determined as the first selected mass. In S26, a plurality of first selected masses corresponding to a plurality of compounds are determined.

In S28, the product ion scan mode is performed using the plurality of determined first selected masses. In other words, each compound separated and extracted from a standard sample is measured using the product ion scan mode. As a result, a product ion mass spectrum is obtained for each compound. In S30, a representative peak in the product ion mass spectrum is identified for each compound, and a mass corresponding to the representative peak is determined as the second selected mass. In S30, a plurality of second selected masses corresponding to a plurality of compounds are determined.

A plurality of first selected masses and a plurality of second selected masses obtained as described above constitute a transition array. It should be noted that the specific example shown in FIG. 3 is what is typically performed.

Figure 4:
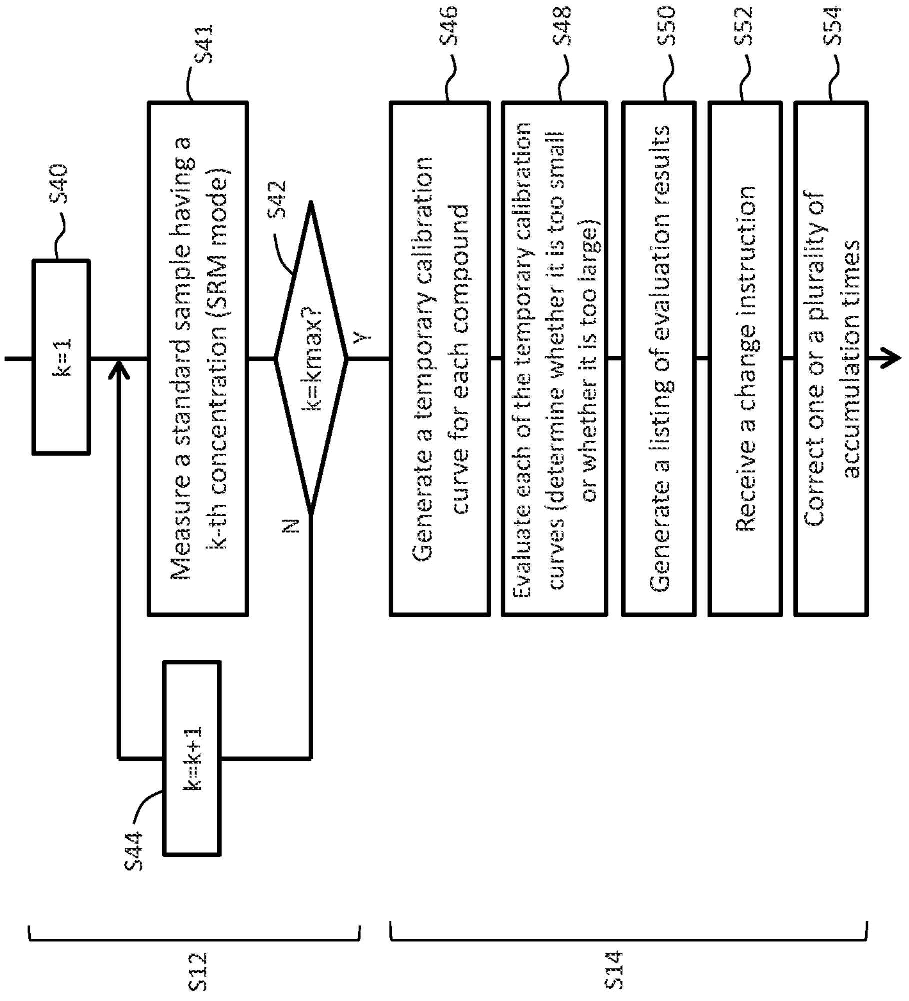
FIG. 4 is a flowchart showing a specific example of S12 and S14 shown in FIG. 2.

FIG. 4 shows a specific example of S12 and S14 shown in FIG. 2. In S40, 1 is assigned to k. In S41, a standard sample having a k-th concentration is measured using the SRM mode. During that process, the above-described transition array is used. In S42, whether or not k has reached kmax is determined. kmax corresponds to m shown in FIG. 2. kmax may be 1 (kmax=1). If kmax is 2 or greater, the process proceeds to S44, in which k is incremented by one, and then S41 is performed again. In that case, the concentration of the standard sample is changed. As a result of performing S41, one or a plurality of detection signal intensities are obtained for each compound.

In S46, a temporary calibration curve is generated for each compound based on one or a plurality of detection signal intensities obtained for each compound. A temporary calibration curve may be generated for each compound based on one detection signal intensity, and either a point of origin or its corresponding point.

In S48, a temporary calibration curve is evaluated for each compound. As will be described later, an appropriate zone is set on a coordinate system that is defined by a concentration axis and an intensity axis. If the temporary calibration curve falls within the appropriate zone, the signal intensity is determined to be appropriate. If the temporary calibration curve is above the appropriate zone, signal saturation is determined. If the temporary calibration curve is below the appropriate zone, sensitivity insufficiency is determined.

In S50, based on an evaluation result for each compound, a list is generated in the form of a listing of evaluation results. The list is shown on the display. In S52, a change instruction is received from a user who viewed the list. In S54, one or a plurality of ion accumulation times are corrected according to the change instruction.

FIG. 5 shows lists by way of example. Reference numeral 62 represents a list that is before change instructions are given, and reference numeral 64 represents a list that is after change instructions are given and ion accumulation times are corrected. Each of the lists 62 and 64 has rows each corresponding to a compound. Each of the rows includes information indicating compound name, transition, collision energy (CE), ion accumulation time, and alert. Referring to the list 62, sensitivity insufficiency is indicated for a compound B, signal saturation is indicated for a compound C, and signal saturation is indicated for a compound D. Thus, the list 62 enables the user to specifically recognize whether or not the ion accumulation times for individual compounds are appropriate.

In an embodiment, after the user provides an instruction for change, a time T1 is automatically added to an ion accumulation time corresponding to sensitivity insufficiency to correct the ion accumulation time. Simultaneously, a time T2 is automatically subtracted from an ion accumulation time corresponding to signal saturation to correct the ion accumulation time. The times T1 and T2 are preset based on experimental results or an empirical rule. The times T1 and T2 may be variable. For example, the times T1 and T2 may be adaptively set based on an amount of deviation of a temporary calibration curve from the appropriate zone or its center line.

Referring to the list 64, the ion accumulation time for the compound B is changed from the standard time to a longer time, the ion accumulation time for the compound C is changed from the standard time to a shorter time, and the ion accumulation time for the compound D is changed from the standard time to a longer time. The indication of an alert on the list has disappeared. It should be noted that a specific time that is to be set as the ion accumulation time may be indicated with a numeric value rather than switching the indication among standard, longer time, and shorter time. Then, the indication of the numeric value may be combined with an indication that is switched among standard, longer time, and shorter time.

As described above, after the ion accumulation time is made appropriate for each compound, a calibration curve is generated for each compound, and subsequently a sample that is under quantitative analysis is measured to determine the concentration of each of the compounds contained therein.

Figure 6:
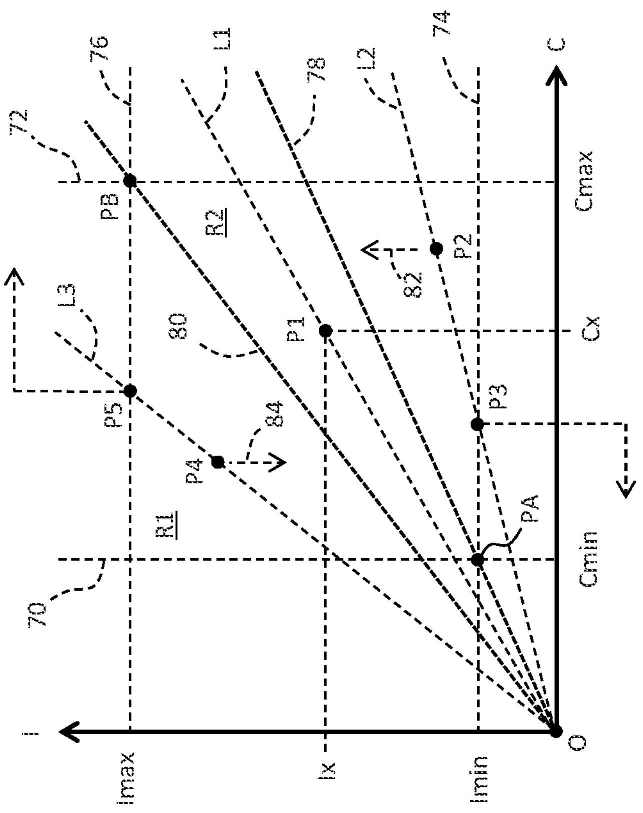
FIG. 6 is a diagram for describing an evaluation method that comprises using a temporary calibration curve.

FIG. 6 shows a temporary calibration curve corresponding to a certain compound by way of example. The horizontal axis serves as a concentration axis, and the vertical axis serves as an intensity axis. Based on a parameter set corresponding to that compound, a minimum concentration Cmin, a maximum concentration Cmax, a minimum intensity Imin, and a maximum intensity Imax are identified. It should be noted that a minimum concentration Cmin, a maximum concentration Cmax, a minimum intensity Imin, and a maximum intensity Imax that are common to a plurality of compounds may be set.

A range between the concentration Cmin and the concentration Cmax is the target concentration range. The target concentration range is a range in which the concentration of a compound is to be identified; in other words, it is a range in which a calibration curve is generated. It is desired that no signal saturation or sensitivity insufficiency occurs over the target concentration range. The minimum intensity Imin corresponds to a threshold value for determining sensitivity insufficiency, and the maximum intensity Imax corresponds to a threshold value for determining signal saturation.

FIG. 6 shows a vertical line 70 corresponding to the minimum concentration Cmin, a vertical line 72 corresponding to the maximum concentration Cmax, a horizontal line 74 corresponding to the minimum intensity Imin, and a horizontal line 76 corresponding to the maximum intensity Imax. A portion that is enclosed by the vertical lines 70 and 72 and the horizontal lines 74 and 76 is a region R1.

A point of intersection of the vertical line 70 and the horizontal line 74 is a reference point PA, and a point of intersection of the vertical line 72 and the horizontal line 76 is a reference point PB. A line extending from the point of origin O through the reference point PA is a reference line 78, and a line extending from the point of origin O through the reference point PB is a reference line 80. Each of the reference lines 78 and 80 is a straight line, but may be a curved line. A point other than the point of origin O may be used to define the reference lines 78 and 80. In the illustrated example, a region that is within the region R1 and that is sandwiched between the reference line 78 and the reference line 80 is an appropriate zone R2.

When an intensity Ix of a detection signal is obtained by measuring a standard sample having a concentration Cx, the coordinates of an actual measurement point P1 corresponding to the concentration Cx and the intensity Ix are identified in the coordinate system. A line passing through the point of origin O and the actual measurement point P1 is a temporary calibration curve L1. The temporary calibration curve may be defined based on a point that serves as a substitute for the point of origin O and the actual measurement point P1. A curved line may be defined as a temporary calibration curve. In the illustrated example, the temporary calibration curve L1 falls within the appropriate zone R2 in the target concentration range. Therefore, the ion accumulation time is determined to be appropriate.

If it is assumed that an actual measurement point P2 that serves as a substitute for the actual measurement point P1 is obtained, a temporary calibration curve L2 is generated. In the target concentration range, the temporary calibration curve L2 falls outside the appropriate zone R2 and below the appropriate zone. In that case, if a compound has a concentration that is lower than the concentration corresponding to the point of intersection P3, sensitivity insufficiency occurs. Therefore, sensitivity insufficiency (to be more precise, the potential to cause sensitivity insufficiency) is determined. In that case, the ion accumulation time is increased so that the actual measurement point P2 moves upward (see reference numeral 82).

If it is assumed that an actual measurement point P4 that serves as a substitute for the actual measurement point P1 is obtained, a temporary calibration curve L3 is generated. In the target concentration range, the temporary calibration curve L3 falls outside the appropriate zone R2 and above the appropriate zone. In that case, if a compound has a concentration that is higher than the concentration corresponding to the point of intersection P5, signal saturation occurs. Therefore, signal saturation (to be more precise, the potential to cause signal saturation) is determined. In that case, the ion accumulation time is reduced so that the actual measurement point P4 moves downward (see reference numeral 84).

As described above, an embodiment of the present disclosure enables evaluation of the appropriateness of the ion accumulation time based on a temporary calibration curve that is defined from an actual measurement point. Specifically, an embodiment of the present disclosure enables determination of signal saturation and sensitivity insufficiency. By setting the ion accumulation time so as to avoid signal saturation and sensitivity insufficiency, the dynamic range of the detector can be used effectively.

A zone other than the illustrated example may be used as the appropriate zone R2. Alternatively, instead of using the appropriate zone R2, for example, an appropriate angle range may be set to determine the appropriateness of the ion accumulation time according to whether or not the angle of a temporary calibration curve falls within the appropriate angle range.

Figure 7:
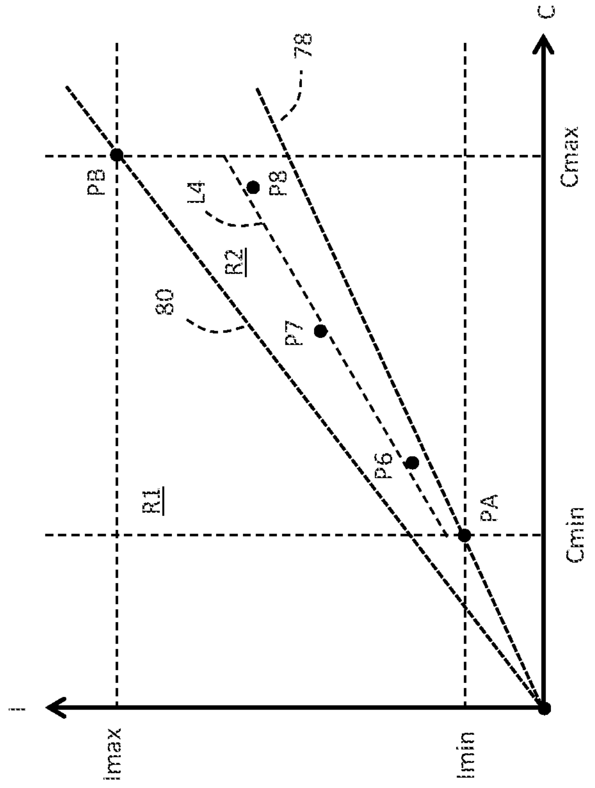
FIG. 7 shows a temporary calibration curve that is defined by a plurality of actual measurement points.

FIG. 7 shows a temporary calibration curve L4 that is defined based on a plurality of actual measurement points P6, P7, and P8. In FIG. 7, the elements already described are denoted by the same reference numerals as the reference numerals used for those elements. The temporary calibration curve L4 is defined as, for example, an interpolation line or an approximation line. To generate the temporary calibration curve L4, it is necessary to repeatedly measure a standard sample while the concentration is varied.

Figure 8:
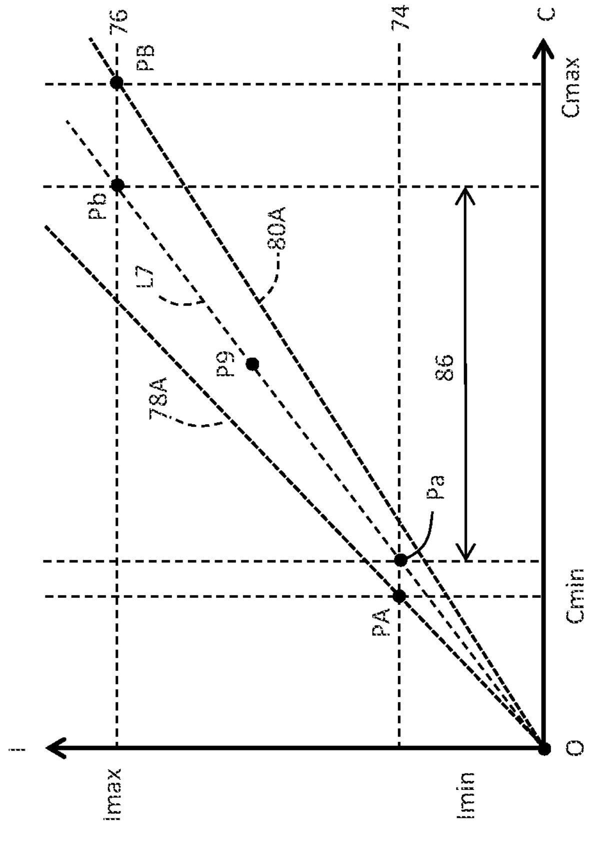
FIG. 8 is a diagram for describing a modification example.

FIG. 8 shows a reference line 78A passing through the reference point PA, and a reference line 80A passing through the reference point PB. The horizontal axis and the reference line 78A form an angle that is greater than an angle formed by the horizontal axis and the reference line 80A.

In such cases, one or both of sensitivity insufficiency and signal saturation occur in the target concentration range, regardless of where an actual measurement point P9 is located. With attention given to, for example, a temporary calibration curve L7 passing through the point of origin O and the actual measurement point P9, the temporary calibration curve L7 and the horizontal line 74 intersect each other at a point Pa. At a concentration that is less than or equal to the concentration corresponding to the point Pa, occurrence of sensitivity insufficiency is predicted. The temporary calibration curve L7 and the horizontal line 76 intersect each other at a point Pb, and occurrence of signal saturation is predicted at a concentration that is greater than or equal to the concentration corresponding to the point Pb.

Under the circumstances shown in FIG. 8, an effective concentration range 86 that is narrower than the target concentration range may be set to determine the concentration only within the effective concentration range 86. In that case, the ion accumulation time may be corrected so that the effective concentration range 86 is set at a desired location on the horizontal axis. Alternatively, gain and other conditions may be changed so as to increase the dynamic range of the detector (to create the circumstances shown in FIG. 6, rather than the circumstances shown in FIG. 8).

In an embodiment, it is possible to correct collision energy along with the ion accumulation time. A liquid chromatograph (LC) may be provided in place of the GC, or a sample may be directly introduced into the ion source without a GC or LC. In such cases as well, a method according to an embodiment of the present disclosure enables determination of whether or not the ion accumulation time is appropriate.

The invention claimed is:

1. A mass spectrometry apparatus comprising:

an ion source configured to ionize a sample;

a collision cell provided downstream of the ion source and configured to perform accumulation and ejection alternately;

a detector configured to detect ions ejected from the collision cell; and a processor configured to evaluate an ion accumulation time of the collision cell based on a concentration of the sample and an intensity of a detection signal output from the detector, wherein the processor:

sets a first region on a coordinate system which is defined by a concentration axis and an intensity axis, the first region being defined by a minimum concentration, a maximum concentration, a minimum intensity and a maximum intensity;

sets, as an appropriate zone, a second region which is within the first region and is sandwiched between a first reference line and a second reference line, the first reference line passing through the origin and a first reference point corresponding to the minimum concentration and the minimum intensity, and the second reference line passing through the origin and a second reference point corresponding to the maximum concentration and the maximum intensity;

generates a temporary calibration curve based on the concentration of the sample and the intensity of the detection signal output from the detector;

determines that the ion accumulation time is appropriate when the temporary calibration curve falls within the appropriate zone in a target concentration range.

2. The mass spectrometry apparatus according to claim 1, wherein a plurality of intensities corresponding to a plurality of concentrations are obtained through repeated measurements of the sample while the concentration of the sample is changed, and wherein the processor generates the temporary calibration curve based on the plurality of concentrations and the plurality of intensities.

3. The mass spectrometry apparatus according to claim 1, wherein a plurality of compounds extracted from a standard sample are sequentially introduced into the ion source, each of the plurality of compounds being the sample, and wherein the processor evaluates the ion accumulation time for each of the compounds.

4. The mass spectrometry apparatus according to claim 3, wherein the processor generates a list showing a result of evaluation of the ion accumulation time for each of the compounds, and wherein the mass spectrometry apparatus comprises a display configured to present the list.

5. The mass spectrometry apparatus according to claim 4, comprising an input device configured to provide an instruction to change the ion accumulation time for each of the compounds.

6. The mass spectrometry apparatus according to claim 3, wherein the compounds are analyzed after the ion accumulation time is set or corrected for each of the compounds that are contained in the standard sample.

7. A mass spectrometry method comprising:

ionizing, in an ion source, a sample;

detecting ions ejected from a collision cell that performs accumulation and ejection alternately, the collision cell being provided downstream of the ion source;

evaluating an ion accumulation time of the collision cell based on a concentration of the sample and an intensity of a detection signal obtained through detection of ions;

setting a first region on a coordinate system which is defined by a concentration axis and an intensity axis, the first region being defined by a minimum concentration, a maximum concentration, a minimum intensity and a maximum intensity;

setting, as an appropriate zone, a second region which is within the first region and is sandwiched between a first reference line and a second reference line, the first reference line passing through the origin and a first reference point corresponding to the minimum concentration and the minimum intensity, and the second reference line passing through the origin and a second reference point corresponding to the maximum concentration and the maximum intensity;

generating a temporary calibration curve based on the concentration of the sample and the intensity of the detection signal output from the detector; and determining that the ion accumulation time is appropriate when the temporary calibration curve falls within the appropriate zone in a target concentration range.

8. The mass spectrometry apparatus according to claim 1, wherein the processor:

determines signal saturation when the temporary calibration curve is above the appropriate zone in the target concentration range; and determines sensitivity insufficiency when the temporary calibration curve is below the appropriate zone in the target concentration range.

9. The mass spectrometry apparatus according to claim 8, wherein when the signal saturation is determined, the processor reduces the ion accumulation time either according to that determination result or according to a user instruction, and wherein when the sensitivity insufficiency is determined, the processor increases the ion accumulation time either according to that determination result or according to a user instruction.

* * * * *